United States Patent
Park et al.

(10) Patent No.: US 10,800,946 B2
(45) Date of Patent: Oct. 13, 2020

(54) DISPLAY APPARATUS

(71) Applicant: SAMSUNG DISPLAY CO., LTD., Yongin-si, Gyeonggi-do (KR)

(72) Inventors: Young-Min Park, Hwaseong-si (KR); Jee-Na Lee, Anyang-si (KR); Jieun Nam, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 314 days.

(21) Appl. No.: 15/831,641

(22) Filed: Dec. 5, 2017

(65) Prior Publication Data

US 2019/0016926 A1 Jan. 17, 2019

(30) Foreign Application Priority Data

Jul. 17, 2017 (KR) .................... 10-2017-0090508

(51) Int. Cl.
| | | |
|---|---|---|
| C09J 7/38 | (2018.01) | |
| C08J 5/18 | (2006.01) | |
| F21V 8/00 | (2006.01) | |
| G02F 1/1333 | (2006.01) | |
| G02F 1/13357 | (2006.01) | |

(52) U.S. Cl.
CPC . *C09J 7/38* (2018.01); *C08J 5/18* (2013.01); *G02B 6/0023* (2013.01);
(Continued)

(58) Field of Classification Search
CPC .... C09J 7/38; C09J 2205/10; C09J 2201/606; C09J 2203/318; G02B 6/0088;
(Continued)

(56) References Cited

U.S. PATENT DOCUMENTS

| | | | |
|---|---|---|---|
| 2003/0012008 A1* | 1/2003 | Chang | G01D 11/28 362/23.1 |
| 2004/0000867 A1* | 1/2004 | Chen | H01L 25/0753 313/512 |

(Continued)

FOREIGN PATENT DOCUMENTS

| | | |
|---|---|---|
| KR | 10-2013-0098717 | 9/2013 |
| KR | 10-2014-0103502 | 8/2014 |

(Continued)

OTHER PUBLICATIONS

Machine English Translation of KR20190043188A; Seo Ji Sang (Year: 2019).*

(Continued)

*Primary Examiner* — Isiaka O Akanbi
*Assistant Examiner* — Glenn D Zimmerman
(74) *Attorney, Agent, or Firm* — F. Chau & Associates, LLC (57) ABSTRACT

A display apparatus includes a display panel, a light guide unit disposed under the display panel that includes a light incident surface, an opposite surface opposite to the light incident surface, side surfaces connecting the light incident surface and the opposite surface, and a light exiting surface facing the display panel, and a foam tape attached on an edge of the light exiting surface and an edge of a lower surface of the display panel to fix the display panel and the light guide unit. The foam tape includes a first adhesive layer, a reflecting layer disposed on the first adhesive layer, a foam layer disposed on the reflecting layer, and a second adhesive layer disposed on the foam layer and attached to the display panel.

17 Claims, 9 Drawing Sheets

(52) U.S. Cl.
CPC ......... *G02B 6/0073* (2013.01); *G02B 6/0088* (2013.01); *G02F 1/133308* (2013.01); *C09J 2201/606* (2013.01); *C09J 2203/318* (2013.01); *C09J 2205/10* (2013.01); *G02B 6/005* (2013.01); *G02B 6/0068* (2013.01); *G02F 1/133615* (2013.01); *G02F 2001/133388* (2013.01); *G02F 2001/133614* (2013.01); *G02F 2202/28* (2013.01); *G02F 2203/02* (2013.01)

(58) Field of Classification Search
CPC .. G02B 6/0023; G02B 6/0073; G02B 6/0068; G02B 6/005; G02B 6/0055; G02B 6/009; C08J 5/18; G02F 1/133308; G02F 2001/133388; G02F 2202/28; G02F 2001/133614; G02F 1/133615; G02F 2203/02; G02F 1/133603; G02F 1/133605; G02F 1/133608
See application file for complete search history.

(56) References Cited

U.S. PATENT DOCUMENTS

| | | | |
|---|---|---|---|
| 2007/0120234 A1* | 5/2007 | Kim | G02B 6/0073 257/666 |
| 2014/0320784 A1* | 10/2014 | Kweon | G02B 6/0055 349/65 |
| 2014/0347600 A1* | 11/2014 | Yun | G02B 6/0055 349/62 |
| 2015/0219832 A1* | 8/2015 | Baek | G02B 6/0055 362/607 |
| 2017/0102492 A1* | 4/2017 | Park | G02B 6/003 |
| 2017/0146856 A1* | 5/2017 | Yokota | G02F 1/133514 |
| 2018/0143488 A1* | 5/2018 | Park | G02F 1/133308 |
| 2019/0113796 A1* | 4/2019 | Jin | G02F 1/133615 |
| 2019/0155088 A1* | 5/2019 | Lee | G02F 1/133524 |

FOREIGN PATENT DOCUMENTS

| | | | | |
|---|---|---|---|---|
| KR | 10-1724760 | | 4/2017 | |
| KR | 20180057942 A | * | 5/2018 | ............. G02B 6/005 |
| KR | 20190043188 A | * | 4/2019 | ........... G02B 6/0053 |
| KR | 20190058761 A | * | 5/2019 | ........ G02F 1/133524 |

OTHER PUBLICATIONS

Machine English Translation of KR20190058761A; Hyun min Gwan (Year: 2019).*
Machine English Translation of KR20180057942A, Han Sang Dae (Year: 2018).*

* cited by examiner

DISPLAY APPARATUS

The present application claims priority under 35 U.S.C. § 119 from, and the benefit of, Korean Patent Application No. 10-2017-0090508, filed in the Korean Intellectual Property Office on Jul. 17, 2017, the contents of which are herein incorporated by reference in their entirety.

BACKGROUND

1. Technical Field

Exemplary embodiments of the inventive concept are directed to a display apparatus. More particularly, exemplary embodiments of the inventive concept are directed to a display apparatus that includes a light guide unit and a display panel.

2. Discussion of the Related Art

A cathode ray tube (CRT) display apparatuses have been used due to their performance and competitive prices. However CRT display apparatuses are large and lack portability. Therefore, display apparatuses, such as plasma display apparatuses, liquid crystal display apparatuses, or organic light emitting display apparatuses, have become more widely used due to their small size, light weight and low-power-consumption.

A liquid crystal display apparatus applies a voltage to a specific molecular arrangement to change that molecular arrangement. A liquid crystal display apparatus displays an image due to changes in optical properties, such as birefringence, rotatory polarization, dichroism or light scattering, of a liquid crystal cell due to changes in the molecular arrangement.

A liquid crystal display apparatus includes a light source, a light guide unit which guides light from the light source, and a display panel that displays an image using light from the light guide unit. A liquid crystal display apparatus uses a mold frame structure to hold the light source, the light guiding unit and the display panel together. Recently, various structures for reducing the thickness of the display apparatus have been proposed.

SUMMARY

One or more exemplary embodiment of the inventive concept can provide a thinner display apparatus capable of improving display quality.

According to an exemplary embodiment of the inventive concept, a display apparatus includes a display panel, a light guide unit disposed under the display panel that includes a light incident surface, an opposite surface opposite to the light incident surface, side surfaces connecting the light incident surface and the opposite surface, and a light exiting surface facing the display panel, and a foam tape attached onto an edge of the light exiting surface and an edge of a lower surface of the display panel to fix the display panel and the light guide unit. The foam tape includes a first adhesive layer, a reflecting layer disposed on the first adhesive layer, a foam layer disposed on the reflecting layer, and a second adhesive layer disposed on the foam layer and attached to the display panel. The foam layer is black.

In an exemplary embodiment, the foam tape may include a first foam tape, a second foam tape, and a third foam tape. The first foam tape may be attached on an edge of the light exiting surface adjacent to the opposite surface. The second foam tape and the third foam tape may be attached on edges of the light exiting surface adjacent to the side surfaces of the light guide unit, respectively.

In an exemplary embodiment, one or more of the first foam tape, the second foam tape, or the third foam tape may further include a blue layer disposed between the reflecting layer and the first adhesive layer. The blue layer of the first foam tape may absorb yellow light.

In an exemplary embodiment, the display apparatus may further include a light source part that emits light and faces the light incident surface of the light guide unit, wherein light emitted from the light source part is guided by the light guide unit and provided to the display panel; and an optical sheet disposed between the display panel and the light guide unit. The light source part may include a first light source and a second light source arranged in a direction in which the light incident surface extends. Each of the first and second light sources may include a light emitting diode, a phosphor layer disposed between the light emitting diode and the light incident surface that includes a phosphor, and a body that receives the light emitting diode and the phosphor layer. The light emitting diode may be located at a position shifted from a center of the body. Each of the first and second light sources may include a first lead frame and a second lead frame, and the light emitting diode may be disposed on the second lead frame.

In an exemplary embodiment, the foam tape may further include a fourth foam tape. The fourth foam tape may be attached on an edge of the light exiting surface adjacent to the light incident surface.

In an exemplary embodiment, the foam tape may further include a film base layer between the reflecting layer and the foam layer, and a protective layer disposed between the foam layer and the second adhesive layer.

In an exemplary embodiment, the reflecting layer may include a material that causes diffuse reflection or specular reflection.

In an exemplary embodiment, the display apparatus may further include a reflecting sheet attached on the side surfaces and the opposite surface of the light guide unit.

In an exemplary embodiment, the display panel may include a display area and a peripheral area surrounding the display area. The foam tape may be disposed to overlap the peripheral area.

According to an exemplary embodiment of the inventive concept, a display apparatus includes a display panel, a light guide unit disposed under the display panel that includes a light incident surface, an opposite surface opposite to the light incident surface, side surfaces connecting the light incident surface and the opposite surface, and a light exiting surface facing the display panel, and a foam tape disposed between the display panel and the light guide unit, and attached on the display panel and the light guide unit. The foam tape may include a first foam tape, a second foam tape, and a third foam tape. The first foam tape may be attached on an edge of the light exiting surface adjacent to the opposite surface, and the second foam tape and the third foam tape may be attached on edges of the light exiting surface adjacent to the side surfaces of the light guide unit, respectively.

In an exemplary embodiment, the foam tape may include a first adhesive layer, a reflecting layer disposed on the first adhesive layer, a foam layer disposed on the reflecting layer, and a second adhesive layer disposed on the foam layer and attached to the display panel. The foam layer may be black.

In an exemplary embodiment, the reflecting layer may include a material that causes diffuse reflection or specular reflection.

In an exemplary embodiment, one or more of the first foam tape, the second foam tape, or the third foam tape may further include a blue layer which absorbs yellow light and disposed between the first adhesive layer and the reflecting layer.

In an exemplary embodiment, the display panel may include a display area and a peripheral area surrounding the display area. The foam tape may be disposed to overlap the peripheral area.

In an exemplary embodiment, the display apparatus may further include a light source part that emits light and faces the light incident surface of the light guide unit, wherein light emitted from the light source part is guided by the light guiding unit and provided to the display panel, and an optical sheet disposed between the display panel and the light guide unit. The light source part may include a first light source and a second light source arranged in a direction in which the light incident surface extends. Each of the first and second light sources may include a light emitting diode, a phosphor layer disposed between the light emitting diode and the light incident surface that includes a phosphor, and a body that receives the light emitting diode and the phosphor layer. The light emitting diode may be located at a position shifted from a center of the body. Each of the first and second light sources may include a first lead frame and a second lead frame, and the light emitting diode may be disposed on the second lead frame.

In an exemplary embodiment, the foam tape may further include a fourth foam tape. The fourth foam tape may be attached on an edge of the light exiting surface adjacent to the light incident surface.

In an exemplary embodiment, the foam tape may further include a film base layer between the reflecting layer and the foam layer, and a protective layer disposed between the foam layer and the second adhesive layer.

In an exemplary embodiment, the display apparatus may further include a reflecting sheet attached on the side surfaces and the opposite surface of the light guide unit.

According to embodiments of the present disclosure, first to third foam tapes are attached to edges of the lower surface of a display panel, and the display panel and the light guide unit are fixed to each other by the first to third foam tapes. With this structure, a slim display apparatus can be realized as compared with a traditional display apparatus that includes a mold frame between the display panel and the light guide unit.

In addition, each of the first to third foam tapes includes a foam layer and a reflective layer, and the reflective layer reflects light reaching the first to third foam tapes back through the light guide unit again. Accordingly, a uniform luminance can be provided for the entire display area. In addition, a black foam layer absorbs light and can prevent light leakage.

In addition, at least one of the first to third foam tapes includes a blue layer to reduce color deviation at a specific position. Accordingly, uniform white light can be provided to the entire light exiting surface. Thus, the display quality can be improved.

DETAILED DESCRIPTION

Hereinafter, exemplary embodiments of the inventive concept will be explained in detail with reference to the accompanying drawings.

Figure 1:
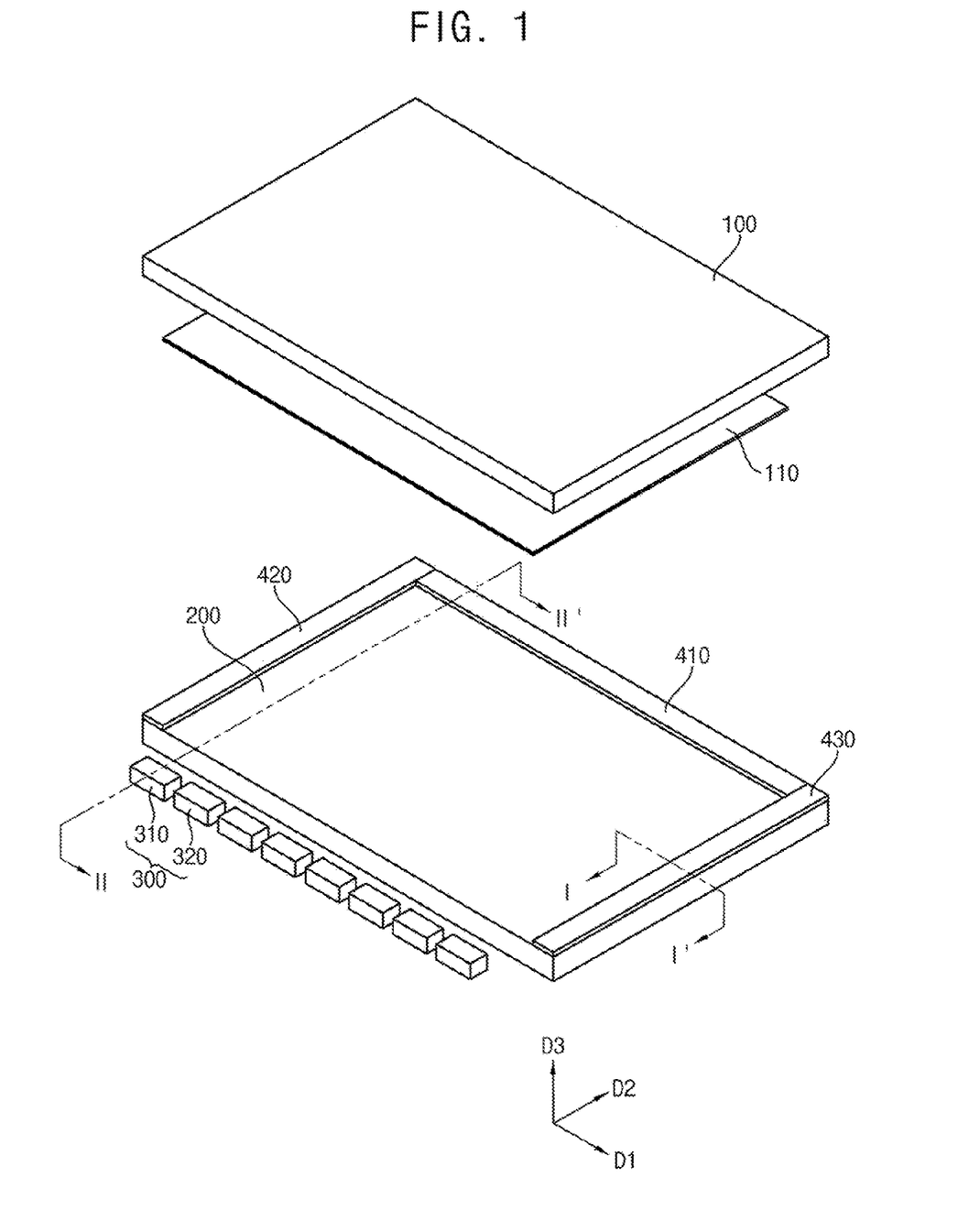
FIG. 1 is an exploded perspective view of a display apparatus according to an exemplary embodiment of the inventive concept.
Figure 2:
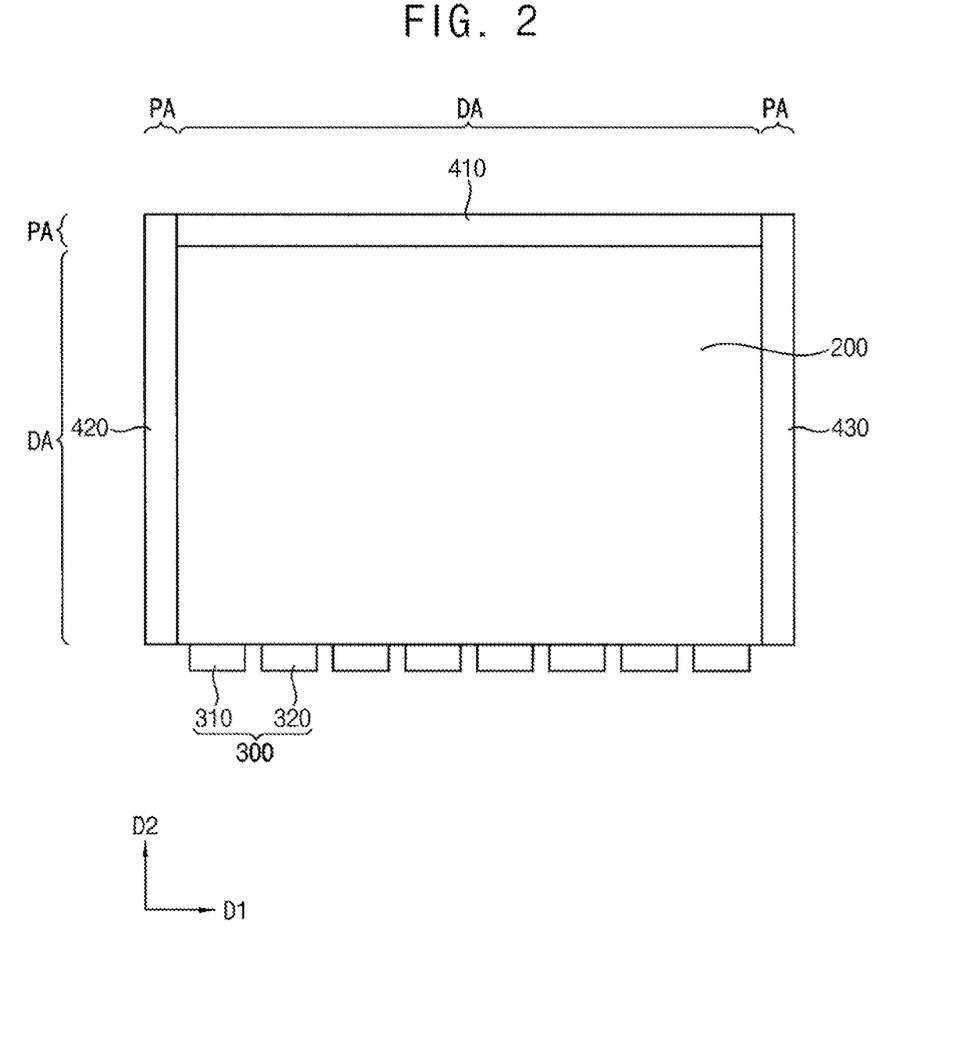
FIG. 2 is a plan view of first to third foam tapes 410, 420 and 430, a light guide unit 200 and a light source part 300 of the display apparatus of FIG. 1.
Figure 3A:
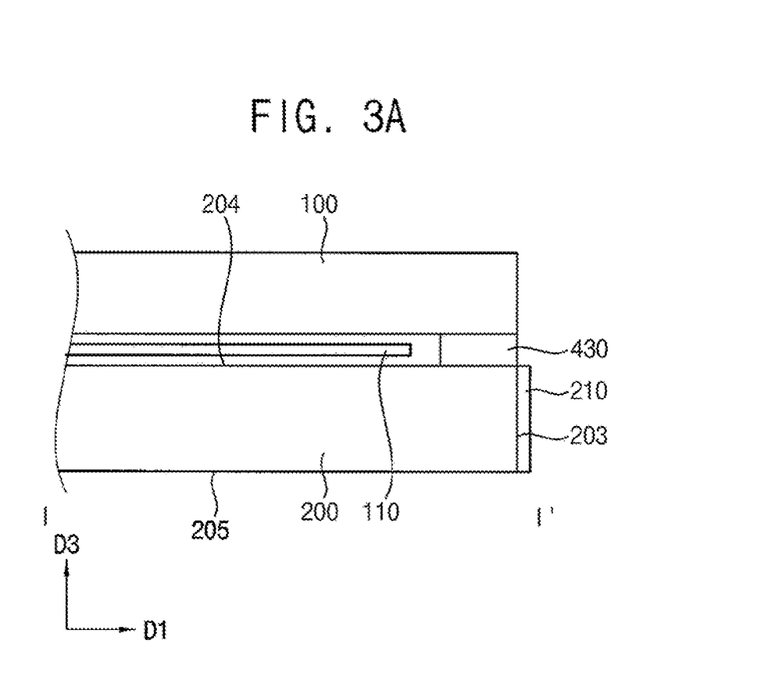
FIG. 3A is a cross-sectional view taken along a line I-I' of FIG. 1.
Figure 3B:
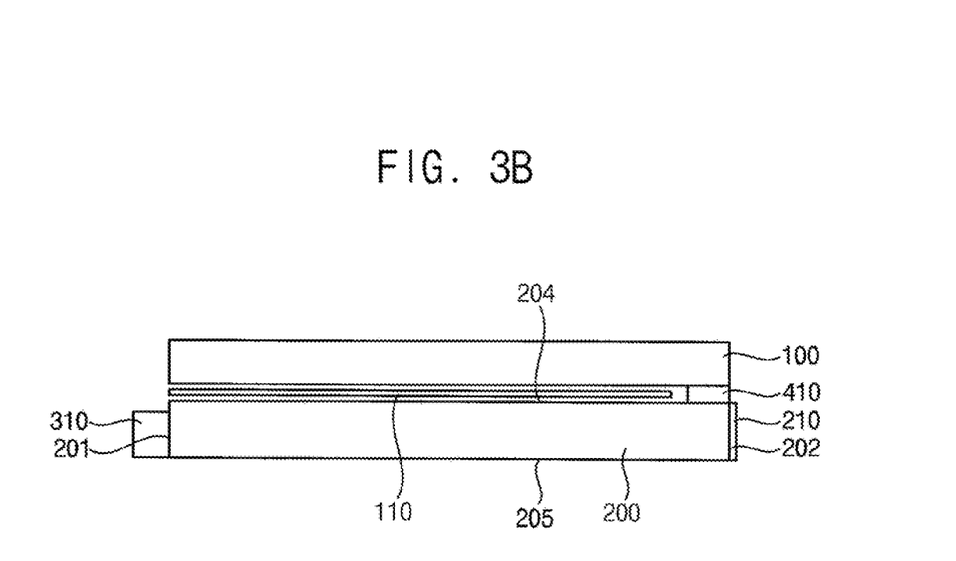
FIG. 3B is a cross-sectional view taken along a line II-II' of FIG. 1.
Figure 4:
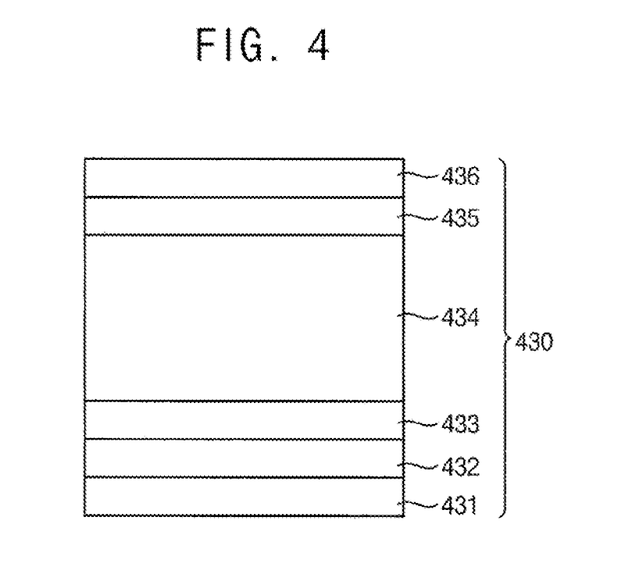
FIG. 4 is a cross-sectional view of the third foam tape 430 of the display apparatus of FIG. 1.

FIG. 1 is an exploded perspective view of a display apparatus according to an exemplary embodiment of the inventive concept. FIG. 2 is a plan view of first to third foam tapes 410, 420 and 430, a light guide unit 200 and a light source part 300 of the display apparatus of FIG. 1. FIG. 3A is a cross-sectional view taken along a line I-I' of FIG. 1. FIG. 3B is a cross-sectional view taken along a line II-II' of FIG. 1. FIG. 4 is a cross-sectional view of the third foam tape 430 of the display apparatus of FIG. 1.

Referring to FIGS. 1, 2, 3A and 3B, a display apparatus according to an embodiment includes a display panel 100, an optical sheet 110, a light guide unit 200, a light source part 300, a first foam tape 410, a second foam tape 420, and a third foam tape 430.

According to exemplary embodiments, the display panel 100 includes a lower substrate on which are disposed a plurality of thin film transistors and signal wirings electrically connected to the thin film transistors, an upper substrate opposite to the lower substrate, and a liquid crystal layer disposed between the lower substrate and the upper substrate.

According to exemplary embodiments, the optical sheet 110 is disposed under the display panel 100. The optical sheet 110 improves optical characteristics of the display and includes a diffusion sheet, a prism sheet, etc. The optical sheet 110 is disposed in a space formed by the first to third foam tapes 410, 420, and 430 between the display panel 100 and the light guide unit 200.

According to exemplary embodiments, the light guide unit 200 is disposed under the display panel 100 and the optical sheet 110. The light guide unit 200 guides light emitted from the light source part 300 to the display panel 100. The light guide unit 200 includes a light incident surface 201 that faces the light source 300, an opposite surface 202 that faces the light incident surface 201, side surfaces 203 connected to the light incident surface 201 and the opposite surface 202, a light exiting surface 204 that faces the display panel 100, and a reflective surface 205 opposite from the light exiting surface 204. The light incident surface 201 and the opposite surface 202 extend in a first direction D1. The side surfaces 203 extend in a second direction D2 which is substantially perpendicular to the first direction D1.

According to exemplary embodiments, a reflecting sheet 210 is attached onto the side surfaces 203 and the opposite surface 202 of the light guide unit 200. The reflecting sheet 210 is a white reflective tape that causes diffuse reflection. Alternatively, the reflecting sheet 210 may be a silver (Ag) reflective tape that causes specular reflection. The light reflected by the side surfaces 203 and the opposite surface 202 is reflected by the reflecting sheet 210 back into the light guide plate 200.

According to exemplary embodiments, the light source part 300 faces the light incident surface 201 of the light guide unit 200. The light source part 300 includes a plurality of light sources. For example, the light source part 300 includes a first light source 310 and a second light source 320. Each of the first and second light sources 310 and 320 are LED packages that include an LED (light emitting diode) and a phosphor layer.

According to exemplary embodiments, the first foam tape 410, the second foam tape 420 and the third foam tape 430 are attached onto a boundary of the light exiting surface of the light guide unit 200. Thus, the first to third foam tapes 410, 420 and 430 are disposed in a peripheral area PA adjacent to a display area DA of the light guide unit 200 in which an image is displayed.

According to exemplary embodiments, the first foam tape 410 is attached onto the light exiting surface of the light guide unit 200 adjacent to the opposite surface 202 of the light guide unit 200. Thus, in a plan view, the first foam tape 410 is attached onto an upper edge of the light exiting surface, as shown in FIG. 2.

According to exemplary embodiments, the second foam tape 420 is attached onto the light exiting surface of the light guide unit 200 adjacent to one of the side surfaces 203 of the light guide unit 200. Thus, the second foam tape 420 is attached onto a left edge of the light exiting surface, as shown in FIG. 2.

According to exemplary embodiments, the third foam tape 430 is attached onto the light exiting surface of the light guide unit 200 adjacent to the other of the side surfaces 203 of the light guide unit 200. Thus, the third foam tape 430 is attached onto a right edge of the light exiting surface, as shown in FIG. 2.

According to exemplary embodiments, the first foam tape 410, the second foam tape 420, and the third foam tape 430 are attached to edges of a lower surface of the display panel 100, so that the display panel 100 and the light guide unit 200 can be fixed to each other. With this structure, a slim display apparatus can be realized as compared with a display apparatus that uses a mold frame between a display panel and a light guide unit.

Referring to FIG. 4, according to exemplary embodiments, the third foam tape 430 includes a first adhesive layer 431, a reflecting layer 432, a film base layer 433, a foam layer 434, a protective layer 435 and a second adhesive layer 436. A cross-sectional structure of the first foam tape 410 and the second foam tape 420 is substantially the same as a cross-sectional structure of the third foam tape 430. Therefore, only the third foam tape 430 will be described in detail.

According to exemplary embodiments, the first adhesive layer 431 is attached on the light guide unit 200. The first adhesive layer 431 adheres the third foam tape 430 to the light guide unit 200. Material constituting the first adhesive layer 431 is not particularly limited. For example, the first adhesive layer 431 may contain a pressure-sensitive adhesive. The pressure-sensitive adhesive may be an acrylic pressure-sensitive adhesive, a rubber pressure-sensitive adhesive, a silicone pressure-sensitive adhesive, etc.

According to exemplary embodiments, the reflecting layer 432 is disposed on the first adhesive layer 431. The reflecting layer 432 reflects light arriving at the third foam tape 430 back through the light guide unit 200. Light absorbed by the first to third foam tapes 410 can reduce the intensity of light at an edge portion of the display area DA adjacent to the peripheral area PA. In a present exemplary embodiment, light is reflected by the reflecting layer 432 back into the light guide unit 200 to ensure a more uniform luminance over the entire display area DA.

According to exemplary embodiments, the reflecting layer 432 includes a material that causes diffuse or specular reflection. For example, the reflecting layer 432 may be a white reflective layer that causes diffuse reflection. Alternatively, the reflecting layer 432 may be a silver (Ag) reflective layer that causes specular reflection. A silver (Ag) reflective layer is formed by coating the film base layer 433. If the reflecting layer 432 is a silver (Ag) reflective layer that causes specular reflection, the display quality improvement effect can be greater than when the reflecting layer 432 causes diffuse reflection. This is because when the reflecting layer 432 causes diffuse reflection, brightness may be increased at an edge portion of the display region DA, which can reduce the uniformity of the brightness throughout the display region DA.

According to exemplary embodiments, the film base layer 433 is disposed on the reflecting layer 432. The film base layer 433 is a transparent film. For example, the film base layer 433 may be a resin film such as a polyethylene terephthalate film.

According to exemplary embodiments, the foam layer 434 is disposed on the film base layer 433. The foam layer 434 includes foamed polyurethane. The foam layer 434 is black. Thus, since black absorbs and blocks light, it is possible to prevent light emitted through the light exiting surface of the light guide unit 200 from propagating through the first to third foam tapes 410, 420, and 430 in the peripheral area PA.

According to exemplary embodiments, protective layer 435 is disposed on the foam layer 434. The protective layer 435 is formed on an upper surface of the foam layer 434. Thus, it is possible to prevent the foam layer 434 from being damaged when the display panel 100 is detached from the third foam tape 430 for rework after bonding.

According to exemplary embodiments, the second adhesive layer 436 is adhered to the display panel 100. The second adhesive layer 436 adheres the third foam tape 430 to the display panel 100. Material constituting the second adhesive layer 436 is not particularly limited. For example, the second adhesive layer 436 may contain a pressure-sensitive adhesive. The pressure-sensitive adhesive may be an acrylic pressure-sensitive adhesive, a rubber pressure-sensitive adhesive, a silicone pressure-sensitive adhesive, etc.

Figure 5:
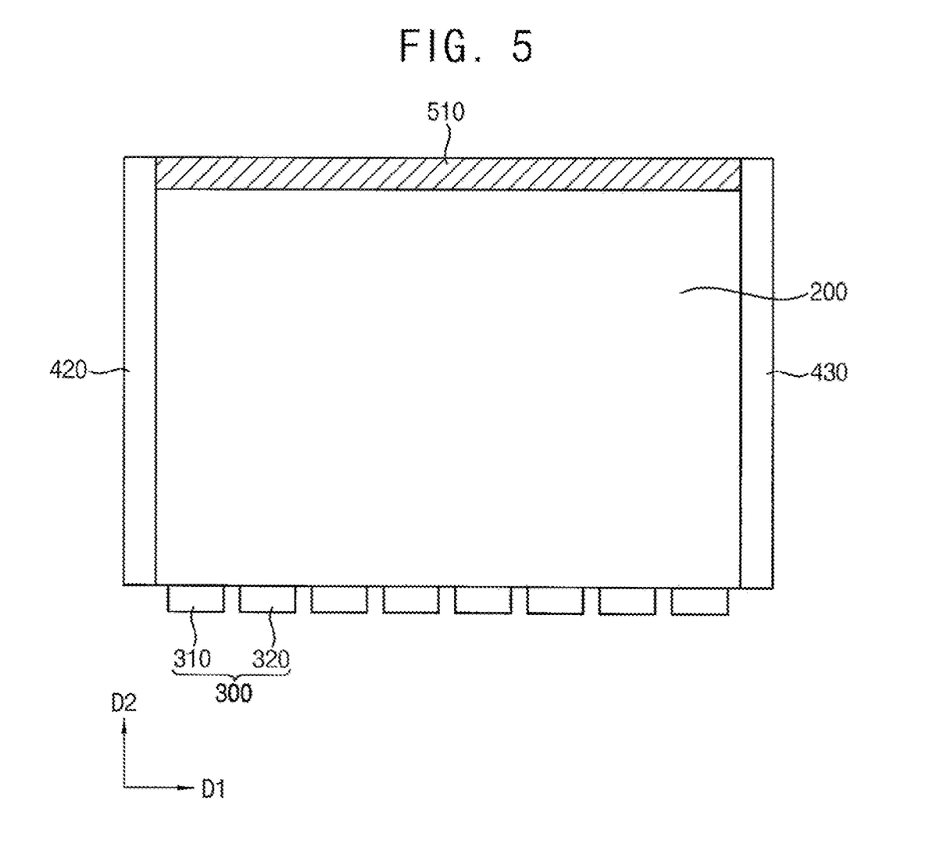
FIG. 5 is a plan view of first to third foam tapes 510, 420 and 430, a light guide unit 200 and a light source part 300 of a display apparatus according to an exemplary embodiment of the inventive concept.
Figure 6:
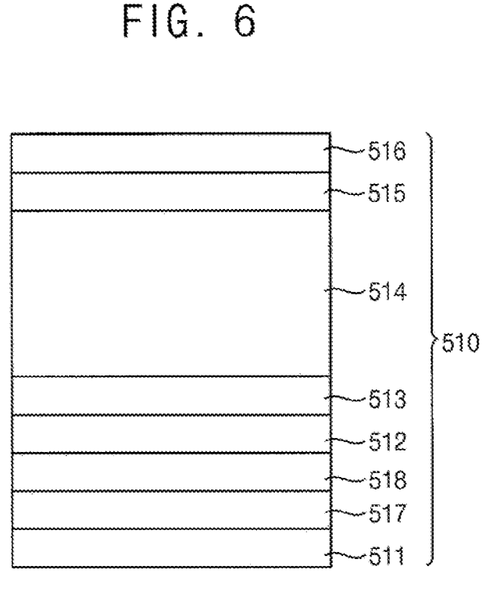
FIG. 6 is a cross-sectional view of the first foam tape 510 of the display apparatus of FIG. 5.

FIG. 5 is a plan view of first to third foam tapes 510, 420 and 430, a light guide unit 200 and a light source part 300 of a display apparatus according to an exemplary embodiment of the inventive concept. FIG. 6 is a cross-sectional view of the first foam tape 510 of a display apparatus of FIG. 5.

Referring to FIGS. 5 and 6, according to exemplary embodiments, a display apparatus of FIGS. 5 and 6 is substantially same as a display apparatus of FIG. 1, except for a first foam tape 510. Therefore, a repeated description will be omitted.

According to exemplary embodiments, a display apparatus includes a display panel, an optical sheet, a light guide unit 200, a light source part 300 that includes first and second light sources 310 and 320, a first foam tape 510, a second foam tape 420 and a third foam tape 430.

According to exemplary embodiments, the first foam tape 510 is attached onto a light exiting surface of the light guide unit 200 adjacent to an opposite surface of the light guide unit 200. Thus, the first foam tape 510 is attached onto an upper edge of the light exiting surface, as shown in FIG. 5.

According to exemplary embodiments, the first foam tape 510 includes a first adhesive layer 511, a blue layer 517, a base layer 518, a reflective layer 512, a film base layer 513, a foam layer 514, a protective layer 515, and a second adhesive layer 516.

According to exemplary embodiments, the first adhesive layer 511 is attached onto the light guide unit 200. The first adhesive layer 511 adheres the first foam tape 510 to the light guide unit 200. Material constituting the first adhesive layer 511 is not particularly limited. For example, the first adhesive layer 511 may be a pressure-sensitive adhesive. The pressure-sensitive adhesive may be an acrylic pressure-sensitive adhesive, a rubber pressure-sensitive adhesive, a silicone pressure-sensitive adhesive, etc.

According to exemplary embodiments, the blue layer 517 is disposed on the first adhesive layer 511. The blue layer 517 absorbs yellow light. The blue layer 517 may be formed by printing or coating a blue ink on the base layer 518.

Figure 11:
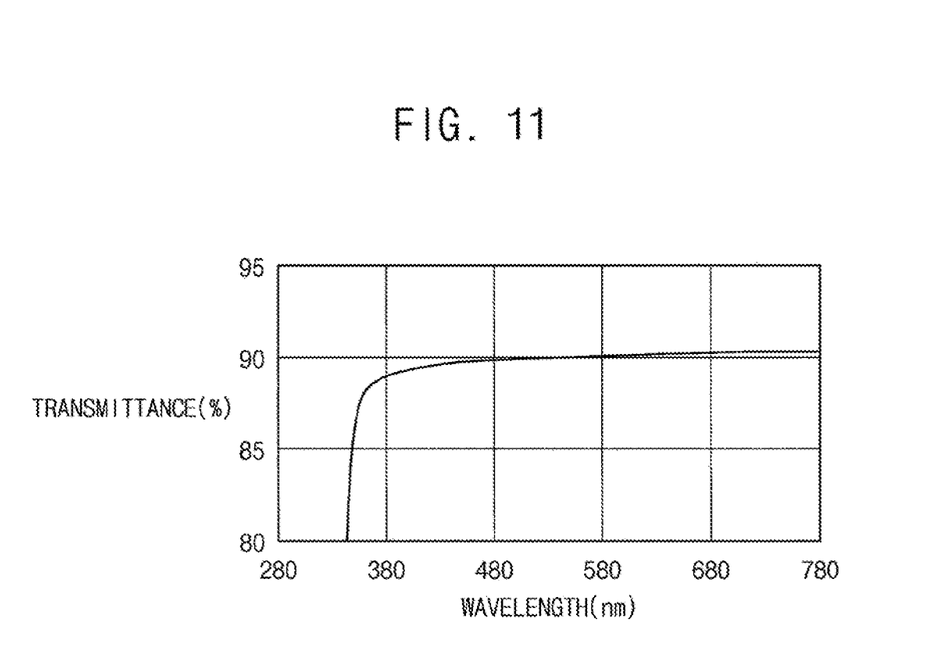
FIG. 11 illustrates a transmittance spectrum of light passing through a light guide unit.

According to exemplary embodiments, light emitted from the light source part 300 is white light. When white light propagates through the light guide unit 200, short wavelength blue light is absorbed by the light guide unit 200, and the white light changes to yellow light, as shown in FIG. 11. This is more apparent with increasing distance through the light guide unit 200, and white light appears yellowish at the opposite surface of the light guide unit 200 far from the light source part 300. The blue layer 517 below the reflecting layer 512 of the first foam tape 510 absorbs yellow light, which reduces the yellowish phenomenon, so that a more uniform white light can be provided to the entire display area DA of the display apparatus. Accordingly, display quality can be improved.

According to exemplary embodiments, the base layer 518 is disposed on the blue layer 517. The base layer 518 is a transparent film. For example, the base layer 518 may be a resin film such as a polyethylene terephthalate film.

According to exemplary embodiments, the reflecting layer 512 is disposed on the base layer 518. The reflecting layer 512 reflects light arriving at the first foam tape 510 back through the light guide unit 200.

According to exemplary embodiments, the reflecting layer 512 includes a material that causes diffuse reflection or specular reflection. For example, the reflecting layer 512 may be a white reflective layer that causes diffuse reflection. Alternatively, the reflecting layer 512 may be a silver (Ag) reflective layer that causes specular reflection. The silver (Ag) reflective layer can be formed by coating the base layer 518.

According to exemplary embodiments, the film base layer 513 is disposed on the reflecting layer 512. The film base layer 513 is a transparent film. For example, the film base layer 513 may be a resin film such as a polyethylene terephthalate film.

According to exemplary embodiments, the foam layer 514 is disposed on the film base layer 513. The foam layer 514 includes foamed polyurethane. The foam layer 514 is black. Thus, since black absorbs and blocks light, it is possible to prevent light emitted through the light exiting surface of the light guide unit 200 from propagating through the first to third foam tapes 510, 420, and 430 in the peripheral area PA.

According to exemplary embodiments, the protective layer 515 is disposed on the foam layer 514. The protective layer 515 is formed on an upper surface of the foam layer 514. Thus, it is possible to prevent the foam layer 514 from being damaged when the display panel 100 is detached from the first foam tape 510 for rework after bonding.

According to exemplary embodiments, the second adhesive layer 516 is adhered to the display panel 100. The second adhesive layer 516 adheres the first foam tape 510 to the display panel 100. Material constituting the second adhesive layer 516 is not particularly limited. For example, the second adhesive layer 516 may contain a pressure-sensitive adhesive. The pressure-sensitive adhesive may be an acrylic pressure-sensitive adhesive, a rubber pressure-sensitive adhesive, a silicone pressure-sensitive adhesive, etc.

According to exemplary embodiments, the second and third foam tapes 420 and 430 of FIG. 5 are substantially same as the second and third foam tapes of the display apparatus of FIG. 1. Therefore, a repeated description will be omitted.

Figure 7:
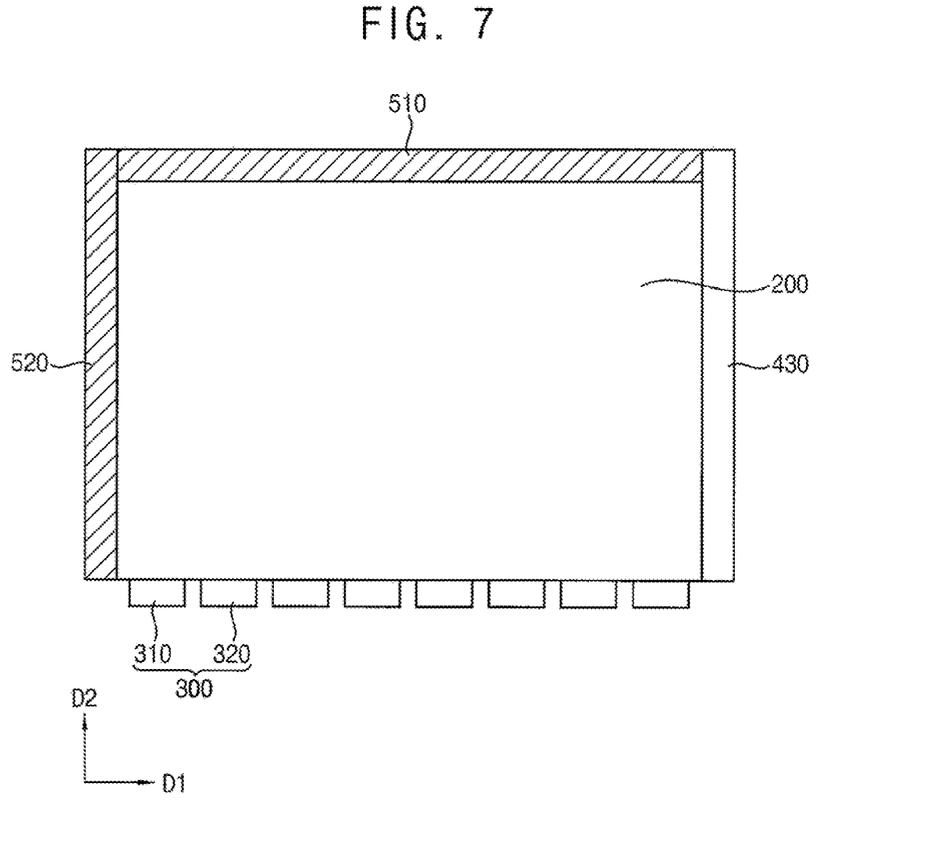
FIG. 7 is a plan view of first to third foam tapes 510, 520 and 430, a light guide unit 200 and a light source part 300 of a display apparatus according to an exemplary embodiment of the inventive concept.
Figure 8:
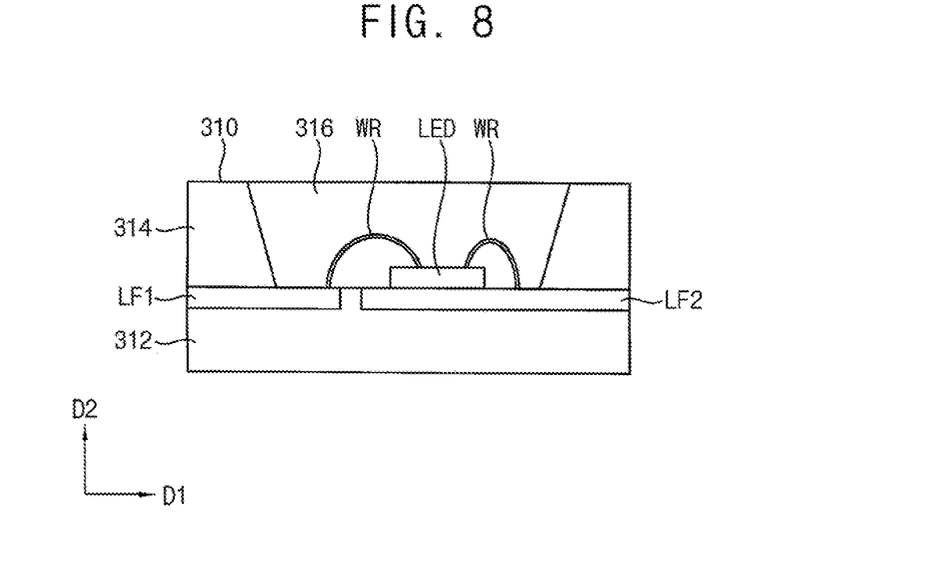
FIG. 8 is a cross-sectional view of a first light source 310 of the light source 300 of the display apparatus of FIG. 7.

FIG. 7 is a plan view of first to third foam tapes 510, 520 and 430, a light guide unit 200 and a light source part 300 of a display apparatus according to an exemplary embodiment of the inventive concept. FIG. 8 is a cross-sectional view of a first light source 310 of the light source 300 of a display apparatus of FIG. 7.

Referring to FIGS. 7 and 8, according to exemplary embodiments, a display apparatus of FIGS. 7 and 8 is substantially same as a display apparatus of FIG. 5, except for first and second light sources 310 and 320 of the light source part 300, and a second foam tape 520. Therefore, a repeated description will be omitted.

According to exemplary embodiments, a display apparatus may include a display panel, an optical sheet, a light guide unit 200, a light source part 300 that includes first and second light sources 310 and 320, a first foam tape 510, a second foam tape 520 and a third foam tape 430.

According to exemplary embodiments, the second foam tape 520 has substantially the same structure as the first foam tape 510 of a display apparatus of FIGS. 5 and 6. That is, the second foam tape 520 includes a first adhesive layer, a blue layer, a base layer, a reflective layer, a film base layer, a foam layer, a protective layer, and a second adhesive layer.

According to exemplary embodiments, the first light source 310 is an LED package. The first light source 310 includes a light emitting diode chip (LED), a bonding wire (WR), a first lead frame LF1, a second lead frame LF2, a body that includes a bottom portion 312 and a side wall portion 314, and a phosphor layer 316.

According to exemplary embodiments, the body includes an insulating material such as polyphthalamide (PPA) or epoxy resin. The light emitting diode chip LED and the phosphor layer 316 are disposed in a space formed by the bottom portion 312 and the side wall portion 314. Accordingly, the phosphor layer 316 is disposed between the light emitting diode LED and a light incident surface of the light guide unit 200. The light emitting diode LED is disposed on the second lead frame LF2. The first lead frame LF1 and the light emitting diode LED are electrically connected by the bonding wire WR. The second lead frame LF2 and the light emitting diode LED are electrically connected by the bonding wire WR. The phosphor layer 316 includes a phosphor.

According to exemplary embodiments, light emitted from the light emitting diode LED propagates through the phosphor layer 316 and into the light incident surface of the light guide unit 200. At this time, the light propagating through the phosphor layer 316 and incident onto the light incident surface is white light. There are various configurations of the phosphors of the phosphor layer 316 and the light emitting diode LED for emitting white light. For example, the light emitting diode LED may generate blue light, and the phosphor layer 316 may include a yellow phosphor.

According to exemplary embodiments, the second light source 320 is substantially the same as the first light source 310 and is adjacent to and spaced apart from the first light source 310 in the first direction D1.

Figure 10A:
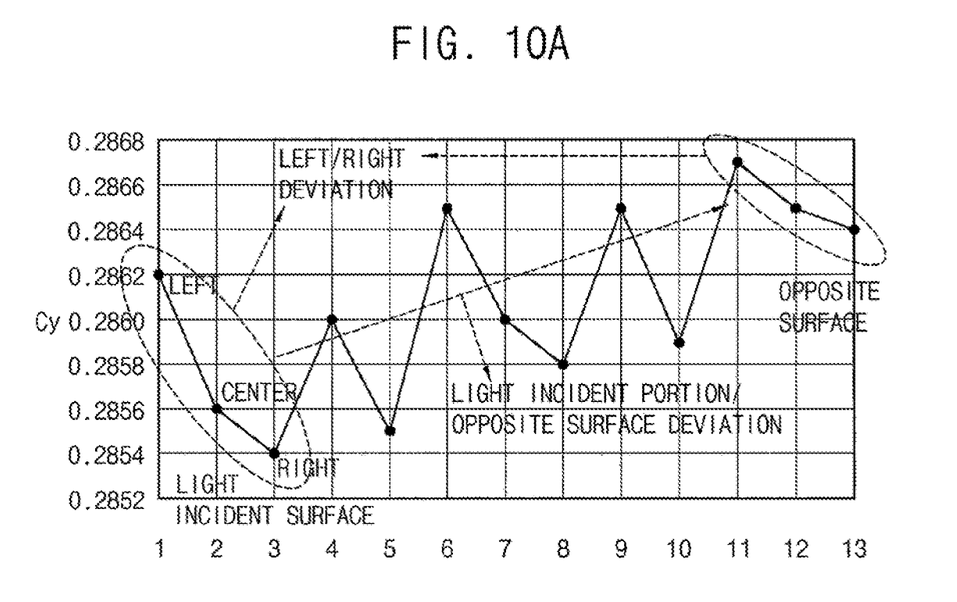
FIGS. 10A and 10B illustrate color deviation of light emitted to a light exiting surface of a light guide unit of a display apparatus according to an embodiment of the present disclosure.
Figure 10B:
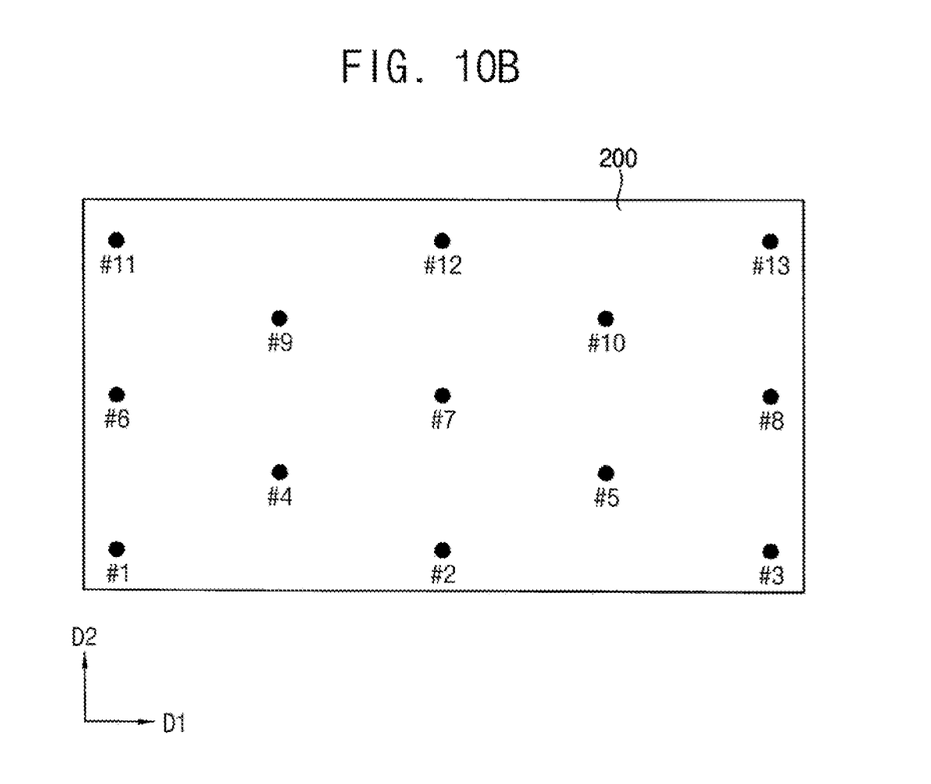

According to exemplary embodiments, the light emitting diode LED is not disposed at a center of the bottom portion 312 but rather is shifted toward one side in the first direction D1 for convenience of manufacturing the first light source 310. Accordingly, the light emitting diode LED is not located at a center of the phosphor layer 316, and light emitted from the first light source 310 can have a right-left color deviation, as illustrated in FIGS. 10A and 10B.

According to exemplary embodiments, right-left color deviation of the display area of a display apparatus occurs due to right-left color deviation of the first and second light sources 310 and 320. However, according to a present embodiment, since the second foam tape 520 includes a blue layer that can reduce the color deviation, and the third foam tape 430 does not include the blue layer, uniform white light can be provided to the entire display area. Thus, the display quality can be improved.

Figure 9:
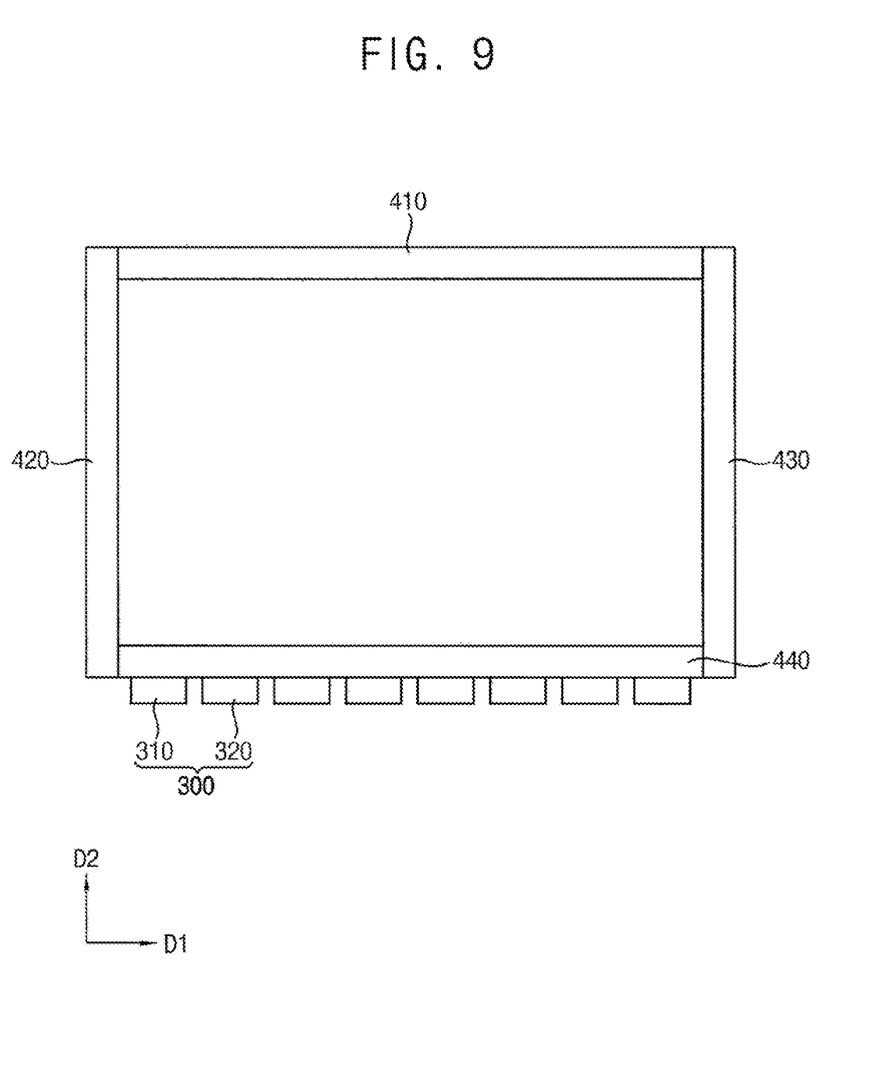
FIG. 9 is a plan view of first to fourth foam tapes 410, 420, 430 and 440, a light guide unit 200 and a light source part 300 of a display apparatus according to an exemplary embodiment of the inventive concept.

FIG. 9 is a plan view of first to fourth foam tapes 410, 420, 430 and 440, a light guide unit 200 and a light source part 300 of a display apparatus according to an exemplary embodiment of the inventive concept.

Referring to FIG. 9, according to exemplary embodiments, a display apparatus is substantially same as a display apparatus of FIG. 1, except that the display apparatus further includes a fourth foam tape 440. Therefore, a repeated description will be omitted.

According to exemplary embodiments, the fourth foam tape 440 adheres to a light exiting surface of a light guide unit 200 adjacent to the light incident surface 201 of the light guide unit 200 shown in FIG. 3B. Thus, in a plan view, the first foam tape 410 is attached to a lower edge of the light exiting surface.

According to exemplary embodiments, one or more of the first to fourth foam tapes 440 may further include a blue layer, such as layer 517 in FIG. 6, to compensate for color deviation.

FIGS. 10A and 10B illustrate color deviation of light emitted to a light exiting surface of a light guide unit of a display apparatus according to an embodiment of the present disclosure.

FIG. 10B depicts a plurality of measurement points on a light exiting surface of a light guide unit. The Cy measured values at 13 points are shown in FIG. 10A. X-axis in FIG. 10A represents the measurement point, and y-axis represents the Cy value. The Cy value is a Cy value of color coordinates. Right-left color deviation, measurement points 1 and 3, and measurement points 11 and 13, and color deviation, measurement points 2 and 12, between light incident and exiting surfaces are shown in the drawing.

FIG. 11 illustrates a transmittance spectrum of light propagating through the light guide unit, according to embodiments of the disclosure. As the light propagates through the light guide unit, the short wavelength portion is absorbed by the light guide unit, and the emitted light becomes yellowish.

According to embodiments of the present disclosure, first to third foam tapes are attached to edges of the lower surface of a display panel, and the display panel and the light guide unit are fixed to each other by the first to third foam tapes. With this structure, a slim display apparatus can be realized as compared with a traditional display apparatus that uses a mold frame between a display panel and a light guide unit.

In addition, according to exemplary embodiments, each of the first to third foam tapes includes a foam layer and a reflective layer, and the reflective layer reflects the light arriving at the first to third foam tapes back through the light guide unit. Accordingly, a more uniform luminance can be provided to the entire display area. In addition, the black foam layer absorbs light and prevents light leakage.

In addition, according to exemplary embodiments, at least one of the first to third foam tapes includes a blue layer that compensates for color deviation at a specific position. Accordingly, a more uniform white light can be provided to the entire light exiting surface. Thus, the display quality can be improved.

The foregoing is illustrative of exemplary embodiments of the inventive concept and is not to be construed as limiting thereof. Although a few exemplary embodiments of the inventive concept have been described, those skilled in the art will readily appreciate that many modifications are possible in exemplary embodiments without materially departing from the novel teachings and advantages of the inventive concept. Accordingly, all such modifications are intended to be included within the scope of the inventive concept as defined in the claims. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A display apparatus, comprising:
   a display panel;
   a light guide unit disposed under the display panel that includes a light incident surface, an opposite surface opposite to the light incident surface, side surfaces connecting the light incident surface and the opposite surface, and a light exiting surface facing the display panel; and
   a foam tape attached onto an edge of the light exiting surface and an edge of a lower surface of the display panel to fix the display panel and the light guide unit, wherein the foam tape comprises a first adhesive layer, a reflecting layer disposed on the first adhesive layer, a foam layer disposed on the reflecting layer, and a second adhesive layer disposed on the foam layer and attached to the display panel, wherein the foam tape comprises a first foam tape, a second foam tape, and a third foam tape, wherein one or more of the first foam tape, the second foam tape, or the third foam tape further comprises a blue layer disposed between the reflecting layer and the first adhesive layer, and the blue layer of the first foam tape absorbs yellow light.

2. The display apparatus of claim 1, wherein
the first foam tape is attached on an edge of the light exiting surface adjacent to the opposite surface,
the second foam tape and the third foam tape are attached on edges of the light exiting surface adjacent to the side surfaces of the light guide unit, respectively.

3. The display apparatus of claim 1, further comprising:
a light source part that emits light and faces the light incident surface of the light guide unit, wherein light emitted from the light source part is guided by the light guiding unit and provided to the display panel; and
an optical sheet disposed between the display panel and the light guide unit,
wherein the light source part comprises a first light source and a second light source arranged in a direction in which the light incident surface extends,
each of the first and second light sources comprises a light emitting diode, a phosphor layer disposed between the light emitting diode and the light incident surface that includes a phosphor, and a body that receives the light emitting diode and the phosphor layer,
the light emitting diode is located at a position shifted from a center of the body,
each of the first and second light sources comprises a first lead frame and a second lead frame, and
the light emitting diode is disposed on the second lead frame.

4. The display apparatus of claim 1, wherein the foam tape further comprises a film base layer between the reflecting layer and the foam layer, and
a protective layer disposed between the foam layer and the second adhesive layer.

5. The display apparatus of claim 1, wherein the reflecting layer comprises a material that causes diffuse reflection or specular reflection.

6. The display apparatus of claim 1, further comprising a reflecting sheet attached on the side surfaces and the opposite surface of the light guide unit.

7. The display apparatus of claim 1, wherein the display panel comprises a display area and a peripheral area that surrounds the display area, and the foam tape is disposed to overlap the peripheral area.

8. The display apparatus of claim 1, wherein the foam layer is black.

9. The display apparatus of claim 2, wherein the foam tape further comprises a fourth foam tape, and
the fourth foam tape is attached on an edge of the light exiting surface adjacent to the light incident surface.

10. A display apparatus, comprising:
a display panel;
a light guide unit disposed under the display panel that includes a light incident surface, an opposite surface opposite to the light incident surface, side surfaces connecting the light incident surface and the opposite surface, and a light exiting surface facing the display panel; and
a foam tape disposed between the display panel and the light guide unit, and attached on the display panel and the light guide unit,
wherein the foam tape comprises a first foam tape, a second foam tape, and a third foam tape,
the first foam tape is attached on an edge of the light exiting surface adjacent to the opposite surface,
the second foam tape and the third foam tape are attached on edges of the light exiting surface adjacent to the side surfaces of the light guide unit, respectively,
wherein the foam tape comprises a first adhesive layer, a reflecting layer disposed on the first adhesive layer, a foam layer disposed on the reflecting layer, and a second adhesive layer disposed on the foam layer and attached to the display panel, wherein one or more of the first foam tape, the second foam tape, or the third foam tape further comprises a blue layer which absorbs yellow light and disposed between the first adhesive layer and the reflecting layer.

11. The display apparatus of claim 10, wherein the foam layer is black.

12. The display apparatus of claim 10, wherein the reflecting layer comprises a material that causes diffuse reflection or specular reflection.

13. The display apparatus of claim 10, wherein the display panel comprises a display area and a peripheral area surrounding the display area, and the foam tape is disposed to overlap the peripheral area.

14. The display apparatus of claim 10, further comprising:
a light source part that emits light and faces the light incident surface of the light guide unit, wherein light emitted from the light source part is guided by the light guiding unit and provided to the display panel; and
an optical sheet disposed between the display panel and the light guide unit,
wherein the light source part comprises a first light source and a second light source arranged in a direction in which the light incident surface extends,
each of the first and second light sources comprises a light emitting diode, a phosphor layer disposed between the light emitting diode and the light incident surface that includes a phosphor, and a body that receives the light emitting diode and the phosphor layer,
the light emitting diode is located at a position shifted from a center of the body,
each of the first and second light sources comprises a first lead frame and a second lead frame, and
the light emitting diode is disposed on the second lead frame.

15. The display apparatus of claim 10, wherein the foam tape further comprises a fourth foam tape, and
the fourth foam tape is attached on an edge of the light exiting surface adjacent to the light incident surface.

16. The display apparatus of claim 10, further comprising a reflecting sheet attached on the side surfaces and the opposite surface of the light guide unit.

17. The display apparatus of claim 11, wherein the foam tape further comprises a film base layer between the reflecting layer and the foam layer, and
a protective layer disposed between the foam layer and the second adhesive layer.

* * * * *